United States Patent [19]

Wright

[11] 4,356,562
[45] Oct. 26, 1982

[54] METHOD AND APPARATUS FOR DEMULTIPLEXING ELECTRICAL SIGNALS

[75] Inventor: Keith G. Wright, Nepean, Canada

[73] Assignee: Control Data Canada, Ltd., Mississauga, Canada

[21] Appl. No.: 127,140

[22] Filed: Mar. 4, 1980

[30] Foreign Application Priority Data

Feb. 21, 1980 [CA] Canada .................................. 346120

[51] Int. Cl.³ .......................... H03D 3/18; H04J 3/06; H04L 7/04
[52] U.S. Cl. ...................................... 370/20; 329/50; 370/100; 370/112; 375/111
[58] Field of Search ....................... 370/20, 100, 112; 375/106, 118, 113, 111; 328/134; 329/122, 124, 125, 50

[56] References Cited

U.S. PATENT DOCUMENTS

| 3,531,777 | 9/1970 | West | 375/118 X |
|---|---|---|---|
| 3,688,196 | 8/1972 | Doelz | 370/20 X |
| 4,015,083 | 3/1977 | Bellisio | 370/100 X |
| 4,054,838 | 10/1977 | Tretter | 375/118 |
| 4,147,895 | 4/1979 | Fenoglio | 375/118 X |
| 4,213,006 | 7/1980 | Gerges | 375/97 |
| 4,227,252 | 10/1980 | Godard | 375/113 |

FOREIGN PATENT DOCUMENTS 1912483 9/1970 Fed. Rep. of Germany ...... 375/111

Primary Examiner—Thomas W. Brown
Attorney, Agent, or Firm—Fleit & Jacobson

[57] ABSTRACT

The specification describes a method and an apparatus for demultiplexing a multiplexed signal having a reference frequency into its original component signals including the steps of sampling the multiplexed signal at a controllable frequency which is greater than the reference frequency of the multiplexed signal to provide a series of samples, rearranging the samples of the series into different series representative of the original component signals, determining the phase differential between the reference frequency and the controllable frequency using the different series and then adjusting the controllable frequency toward synchronism with the reference frequency by an amount proportional to the phase differential.

32 Claims, 9 Drawing Figures

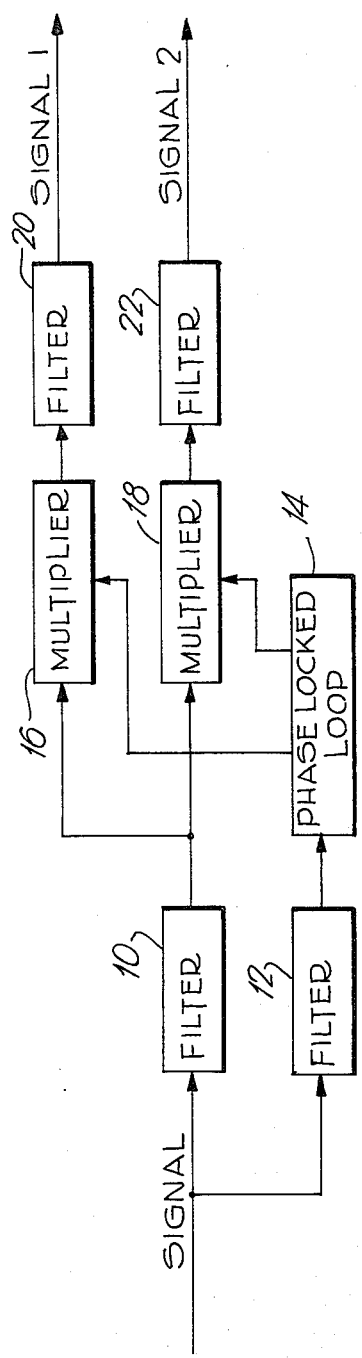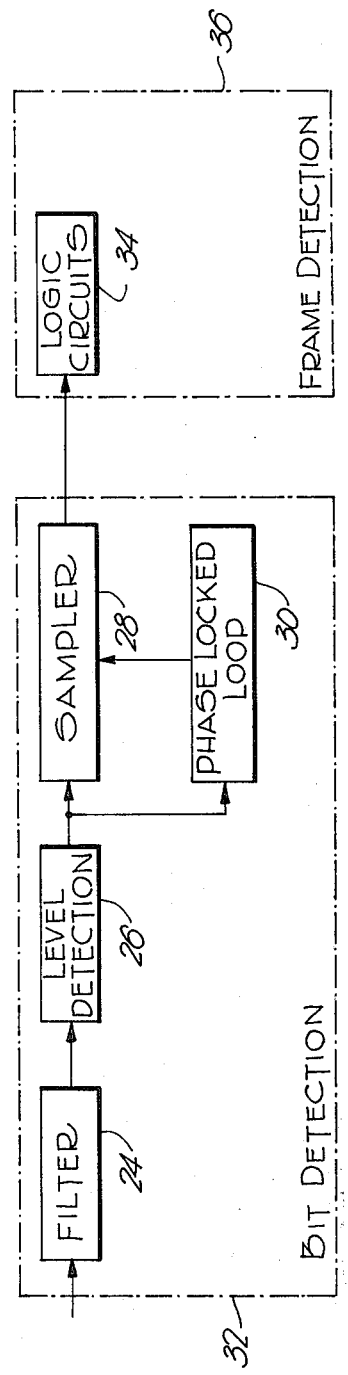

METHOD AND APPARATUS FOR DEMULTIPLEXING ELECTRICAL SIGNALS

The present invention relates to a method and an apparatus for decomposing, demultiplexing or demodulating into their original component signals electrical signals which have been constructed by multiplexing from several independent sources or channels. In particular, the present invention enables the demultiplexing of any format of multiplexed signal by simple changes in operating mode of the invention.

BACKGROUND OF THE INVENTION

In many communication systems, it is necessary to transmit several independent signals over a single channel communication link. This link may be either a cable, an RF link or other form of signal transmission. In order to achieve this, the independent signals are modulated, multiplexed or combined in some way prior to transmission. In some cases, the same link may be used for transmission of different formats of combined signals under different circumstances. An example of this lies in the field of anti-submarine warfare which uses a method of monitoring underwater sounds in the ocean. Sonobuoys are dropped into the ocean and transmit data via an RF link to an aircraft or ship. Different sonobuoys are used for different purposes, some of which use multiple sensors. Different types of buoys multiplex these in a different way prior to transmission. One of the first tasks to perform on receipt of the signal is to demultiplex the information into its original independent elements.

There are many well known multiplexing techniques. Two of these are (i) in-phase and quadrature multiplexing by a carrier frequency and (ii) pulse code modulation (PCM).

In general, the in-phase and quadrature multiplexing technique multiplexes two signals containing independent information whereby one signal is multiplexed by a carrier frequency and the other by the quadrature wave of the carrier frequency, the resulting products are added together with the carrier itself, with a phase reference (a sinusoidal signal which may be at the carrier frequency or some other frequency). The combined signal which appears as sidebands around the carrier frequency is transmitted. This technique is used for the transmission of FM stereo radio signals and for the directional signals of some sonobuoys.

A current technique for demultiplexing a signal of this type utilizes a plurality of filters, a phase locked loop and multipliers. In particular, the incoming multiplexed signal is initially passed through two filters. One filter identifies the phase and magnitude of the reference frequency of the multiplexed signal and a second filter identifies the modulation sidebands of the signal. The phase and/or frequency signal may be notched out of this latter filter. The identified reference frequency is then fed to the phase locked loop which generates two demodulation or demultiplexing signals.

The phase locked loop may be an electrical or electromechanical device and may contain a single loop for both frequency and phase or separate loops for each of frequency and phase. The demodulation signals are 90 degrees out of phase with one another and may be sinusoidal or non-sinusoidal (for example, square waves). The demodulation signals are each fed to a multiplier. The signal issuing from the second filter is fed to both multipliers for multiplication by the demodulation signals produced by the phase locked loop. The signals issuing from the multipliers are representative of the two original component signals but will be corrupted by frequencies associated with the demultiplexing process. Accordingly, the respective signals are passed through a third filter, a low-pass filter, to suppress frequencies which are at or above the carrier frequency and associated with the demultiplexing process. This technique is entirely analog and, therefore, will require a certain amount of adjustment to maintain accuracy, repeatability and predictability.

In the PCM technique, the independent signals are sampled, quantized and described as digital numbers. The independent channels of information are then packed to form a digital frame, some form of code is added and the signal is transmitted with a different characteristic pattern used to represent each different digital number. This technique can be used to multiplex as many channels as are required. Typically, a binary code is used, with one characteristic pattern being the so-called "non-return to zero" format, whereby two different voltage levels are used to identify the binary 1 to 0 respectively. This square wave pattern is then reduced in bandwidth by filtering to meet the transmission line bandwidth.

The current technique for demultiplexing a PCM signal is generally comprised of two sequential processes—a bit detection process (also known as bit synchronization) and a frame synchronization process. The signal, after bit detection, consists of a serial digital bit stream plus clock, where the original binary signal has been correctly detected, but the start positions of the data frame within the continuous data stream has not yet been identified. A conventional technique of demultiplexing is to utilize a low-pass or bandpass filter to identify the information frequency band. Then, a level detection circuit is used to instantaneously identify the signal as being a 1 or a 0 level. However, this signal will be corrupted by the bandwidth filtering process described above so as to only be accurate when samples are taken at or near the center of the original bit intervals. A phase locked loop circuit is provided to generate a frequency at the bit transmission rate and usually consists of a voltage controlled oscillator, a phase detector and filter arrangement. A sampling circuit is provided to instantaneously sample the waveform at times specified by the phase locked loop and detect the signal at that instant in time as being a 1 or a 0.

It is apparent from the above briefly described demultiplexing techniques that they differ from one another and, therefore, would utilize different devices to implement them. The present invention provides a method and an apparatus which can be used to demultiplex any format of multiplexing.

SUMMARY OF THE INVENTION

In general, the present invention samples the multiplexed signal at a sampling frequency which is either continuously or periodically monitored and adjusted when necessary to ensure synchronization thereof with the multiplexing reference frequency.

More specifically, the present invention provides a method of demultiplexing an analog signal which consists of components representing the result of multiplexing one or more original signals and a reference frequency comprising the steps of sampling the analog signal at a controllable frequency which is a multiple of the reference frequency to provide a series of samples;

rearranging the samples of the series into different series representative of the one or more original signals and the in phase and quadrature components of the reference frequency; determining the phase differential between the reference and controllable frequencies by determining the d.c. content of the series which represent the in phase and quadrature components of the reference frequency; and adjusting the controllable frequency toward synchronism with the reference frequency by an amount which is a function of the phase differential determined in the previous step.

Another aspect of the present invention provides an apparatus for demultiplexing an analog signal which consists of components representing the result of multiplexing one or more original signals and a reference frequency, comprising means for sampling the analog signal at a controllable frequency which is a multiple of the reference frequency and providing a series of signals representative of samples taken; means for rearranging the series of signals into different series of signals representative of the original signals and the reference frequency; means responsive to the different series of signals for determining the phase differential between the reference frequency and the controllable frequency by measuring the d.c. content of the series which represent the in phase and quadrature components of the reference frequency and producing a signal representative of the determined phase differential; and means for generating the controllable frequency and providing sampling signals to the sampling means. The generating means is adapted to adjust either the phase or magnitude or both of the controllable frequency in response to the signal representative of the determined phase differential for moving the controllable frequency toward synchronism with the reference frequency.

These and other features of the invention will become more apparent from the following description wherein reference is made to the appended drawings:

FIG. 1 is a block diagram illustrating a current technique of demultiplexing a signal which has been multiplexed in-phase and in-quadrature;

FIG. 2 is a block diagram illustrating a current demultiplexing technique for demultiplexing a signal which has been multiplexed by the pulse code modulation (PCM) technique;

Figure 3:
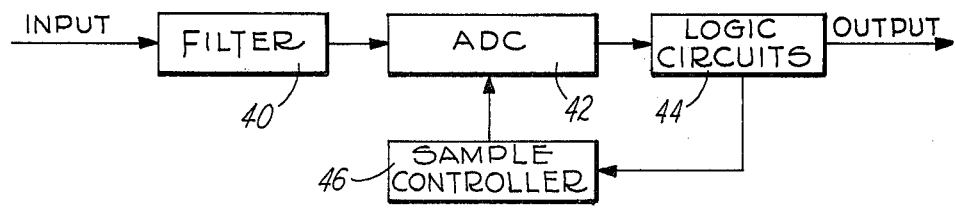
FIG. 3 is a block diagram illustrating the technique of the present invention for demultiplexing any format of multiplexed signal.

FIG. 1 illustrates in block diagram form a current technique for demultiplexing a signal which has been multiplexed in-phase and in-quadrature with a carrier signal. The incoming multiplexed signal is fed to each of filters 10 and 12. Filter 10 identifies the modulation side bands of the multiplexed signal and feeds the resulting signal to each of multipliers 16 and 18. Filter 12 identifies the phase and/or magnitude of the reference frequency of the multiplexed signal and supplies a signal to a phase locked loop circuit 14. circuit 14 generates demodulation signals in-phase and in-quadrature with the phase reference signal received from filter 12 and supplies the in-phase demodulation signal to multiplier 16 and the quadrature signal to multiplier 18. Circuit 14 may be an electrical or electromechanical device and may contain a single loop for both frequency and phase or separate loops for each of frequency and phase. The demodulation signals produced by circuit 14 may be sinusoidal or non-sinusoidal.

Each of multipliers 16 and 18 multiply the respective signals received from filter 10 and phase locked loop 14 and provide signals representative of the original component signals. Low-pass filters 20 and 22 are provided to suppress or remove from the signals produced by the multipliers 16 and 18 frequencies associated with the demodulation process.

With reference to FIG. 2, the PCM signal is initially supplied to filter 24 which identifies the information frequency band and supplies an appropriate signal to a level detection circuit 26. Circuit 26 is used to instantaneously identify the signal as being a 1 or a 0 level. As mentioned earlier, this identification will be corrupted by the bandwidth filtering process so as to only be accurate when sampled at or near the center of the original bit interval. The level detection circuit 26 supplies a signal to a sampler 28 and a phase locked loop 30. The phase locked loop 30 generates a frequency at the bit transmission rate and usually consists of a voltage controlled oscillator, a phase detector and a filter arrangement and supplies a signal to sampler 28. Sampler 28 is a circuit which instantaneously samples the wave form received from the level detection circuit at times specified by the phase locked loop and detects the signal at that instant in time as being either a 1 or a 9. Filter 24, level detection circuit 26, sampler 28 and phase locked loop circuit 30 together form a bit detection unit 32. Sampler 28 supplies a signal to logic circuits 34 which identify the original component signals of the multiplexed signal. The logic circuit may be generally referred to as a frame detection unit 36.

Before describing particulars of the present invention, it is to be understood that the multiplexing process always consists of mixing independent signals in an orderly manner. This orderly mixing process invariably contains an explicit or implicit reference frequency.

The present invention converts the analog, multiplexed signal into a digital signal by sampling the analog signal at a frequency which is four times the reference frequency of the multiplexed signal and which is continuously monitored and adjusted when necessary to ensure synchronism with the reference frequency. A sample of the analog signal is a measurement of its amplitude at a particular instant of time. That measurement is quantized or expressed as a digital number. As the sampling or conversion process proceeds, a series of samples expressed as digital numbers and representative of the original analog signal are obtained. The samples are rearranged, depending upon the type of multiplexing, in a very simple manner in order to obtain the original component signals of the multiplexed signals. Once the samples which are representative of the original component signals are available, the relationship between the sampling frequency and the reference frequency may be determined and if found to exceed predetermined limits, either the phase or magnitude or both of the sampling frequency may be adjusted to ensure synchronism with the reference frequency.

FIG. 3 illustrates in block diagram form the method and system of the present invention. Initially, the analog, multiplexed signal is fed to a filter 40 which removes unwanted frequencies from the multiplexed signal. Such a filter is required in all demultiplexing techniques. The filtered multiplexed signal which results from filter 40 is fed to an analog-to-digital converter 42. Converter 42 converts the analog, multiplexed signal into a digital signal by taking measurements of the amplitude of the signal at a controllable frequency which is four times the reference frequency and which is above the nyquist frequency of the original component signals prior to multiplexing. The measurements will be referred to as samples. The samples are expressed as digital numbers. Thus, converter 42 produces a series of samples or digital numbers representative of the filtered, multiplexed signal at particular instants of time.

The series of samples or digital signals produced by converter 42 are fed to logic circuits 44. Logic circuits 44 perform basically two functions. Firstly, they sort or process the series of samples received from converter 42 and output them as several independent series representing the original component signals prior to multiplexing. Secondly, the circuits analyze the series of samples received from converter 42 in order to determine the phase relationship between the sampling frequency and the reference frequency and supply a control feedback signal to sample controller 46.

Controller 46 produces and supplies signal to converter 42 at the sampling frequency, the signals being effective to cause converter 42 to take samples of the multiplexed signal. Either or both of the phase and magnitude parameters of the sampling frequency may be adjusted by the controller 46. Either or both are adjusted upon receipt of an appropriate signal from logic circuits 44 in order to maintain the sampling frequency in synchronism with the reference frequency.

The application of the above described method and device for demultiplexing previously multiplexed signals will now be described with reference to three multiplexing techniques, (i) in-phase and quadrature multiplexing, (ii) in-phase and quadrature multiplexing with a sideband and (iii) pulse code modulation.

IN-PHASE AND QUADRATURE MULTIPLEXING

In in-phase and quadrature multiplexing, it will be understood that two independent signals $A_1(t)$ and $A_2(t)$, with bandwidths $B_1$ and $B_2$, and no d.c. content, are multiplied by $\sin \omega_c t$ and $\cos \omega_c t$, respectively. $\omega_c$ is the carrier or reference frequency and is greater than B, where B is the greater of $B_1$ and $B_2$. The thus modulated signals are added together along with the carrier itself in order to form multiplexed signal M(t):

$$M(t) = A_1(t) \sin \omega_c t + A_2(t) \cos \omega_c t + \sin \omega_c t. \text{ tm (1)}$$

Figure 4:
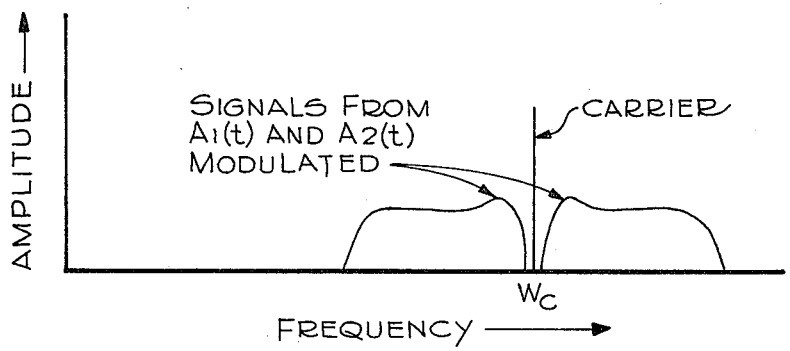
FIG. 4 is a graph illustrating the frequency spectrum of an in-phase and quadrature multiplexed signal.

FIG. 4 illustrates the resulting frequency spectrum.

In order to recover original signals $A_1(t)$ and $A_2(t)$, multiplexed signal M(t) is passed through bandpass filter 40 having a pass band of $\omega_c \pm B$. This results in a filtered multiplexed signal $M_F(t)$. The filtered multiplexed signal is then supplied to analog-to-digital converter 42 which samples $M_F(t)$ at adjustable and controllable sampling frequency $\omega_F$ which is four times $\omega_c$. In particular, converter 42 measures the amplitude of $M_F(t)$ at instants in time specified by sample controller 46, expresses the measured amplitude as digital words and feeds the digital words in sequence to logic circuits 44. The sequence of digital words produced by converter 42 will be referred to as sequence of samples S.

Logic circuits 44 rearrange the sequence of samples S received from converter 42 to form two new series of samples, I and Q in accordance with the following expressions:

$$I_{(r)} = S_{(2r-1)} \times (-1)^r \quad (2)$$

$$Q_{(r)} = S_{(2r)} \times (-1)^r \quad (3)$$

I and Q represent the original component signals $A_1(t)$ and $A_2(t)$ respectively.

The analog or filtered multiplexed signal $M_F(t)$ is sampled at four times the reference frequency, every 90 degrees thereof, because at those instances, the contribution of the multiplexed signal by one of the original component signals is nil. More particularly, it will be seen that for the four samples taken within the period of and in-phase with the reference frequency, two of the samples will be comprised of only one of the original component signals while the other two samples will be comprised of a contribution from only the other of the original component signals. Thus, when the argument of the signal modulating $A_1(t)$ is 0 or 180 degrees, the contribution by the resultant to the multiplexed signal will be 0. Thus, the first and third samples taken within the period of the reference frequency would contain no contribution from signal modulating $A_1(t)$. Similarly, when the argument of the signal modulating $A_2(t)$ is 90 or 270 degrees, the contribution by the resultant to the multiplexed signal will be 0. This occurs at the second and fourth samples in the period of the reference frequency.

Accordingly, when determining the series of samples I corresponding to original signals $A_1(t)$ there is no need to consider either samples 1 or 3 of the samples obtained within the period of the reference frequency by converter 42 since samples 1 and 3 do not contain any contribution from the signal modulating $A_1(t)$. Similarly, when determining the series of samples Q corresponding to original signal $A_2(t)$ there is no need to consider samples 2 and 4 within the period of the reference frequency.

It will be apparent, therefore, that the present invention provides a method and means for quickly and readily identifying the original component signals $A_1(t)$ and $A_2(t)$. It is believed to be within the knowledge of those skilled in the art to provide logic circuits which rearrange the sequence of samples S into the new sequences of samples I and Q in accordance with the foregoing instructions. Accordingly, it is not deemed necessary to discuss the logic circuits in detail.

In order to ensure that sequences of samples I and Q are representative of the original component signals $A_1(t)$ and $A_2(t)$, it will be appreciated that it is important to maintain synchronism as between the reference frequency $\omega_c$ and the sampling frequency $\omega_F$. Accordingly, the logic circuits 44 carry out a further function and that is to determine the phase differential as between the reference frequency and the sampling frequency. To do so, logic circuits 44 determine the d.c. content, $D_1$ and $D_2$, of sequences I and Q, respectively, and obtain the phase differential in accordance with the following expression:

$$\phi\text{rel} = \text{ARCTAN } D_2/D_1 \quad (4)$$

Upon determining the phase relationship between the reference frequency and the sampling frequency, logic circuits 44 provide a signal representative of the phase differential to sample controller 46. Upon receipt of such signal, controller 46 adjusts the phase parameter of the sampling frequency so as to bring the latter more closely into synchronism with the reference frequency. This process is repeated at regular intervals in order to ensure and maintain correct phasing.

Based upon the history of phase adjustments, the magnitude of the sampling frequency may be adjusted from time to time. That is, if a total rotation in-phase of +c cycles has been required in time t, then a magnitude adjustment of +c/t Hz would be appropriate.

It will be seen that the foregoing procedure ensures synchronism of sampling and the main task of the process is thus reduced to a simple arithmetic calculation involving only negation and addition.

The following description pertains to demultiplexing of a three-channel signal using in-phase and quadrature to a carrier plus baseband.

IN-PHASE AND QUADRATURE PLUS BASEBAND MULTIPLEXING

Figure 5:
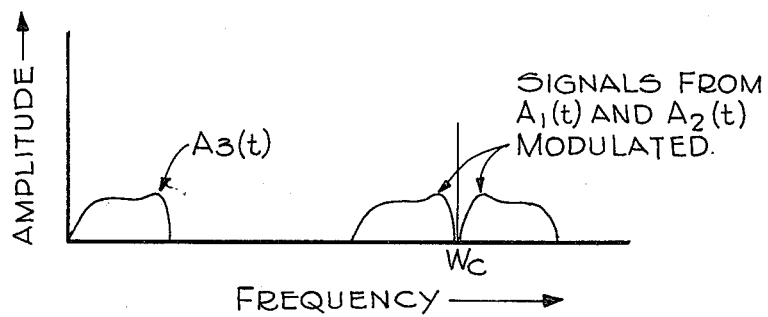
FIG. 5 is a graph illustrating the frequency spectrum of an in-phase and quadrature multiplexed signal with side bands.

The signal produced in accordance with this multiplexing technique is similar to that just described but a third channel or signal $A_3(t)$ is added as a baseband to produce the frequency spectrum illustrated in FIG. 5.

As with the previous example, the multiplexed signal is referred to as M(t) and the original component signals are referred to as $A_1(t)$ and $A_2(t)$. The multiplexed signal M(t) is passed through a low-pass filter 40 with cut off of $\omega_c + B$. This results in a filtered multiplexed signal $M_F(t)$.

Figure 6:
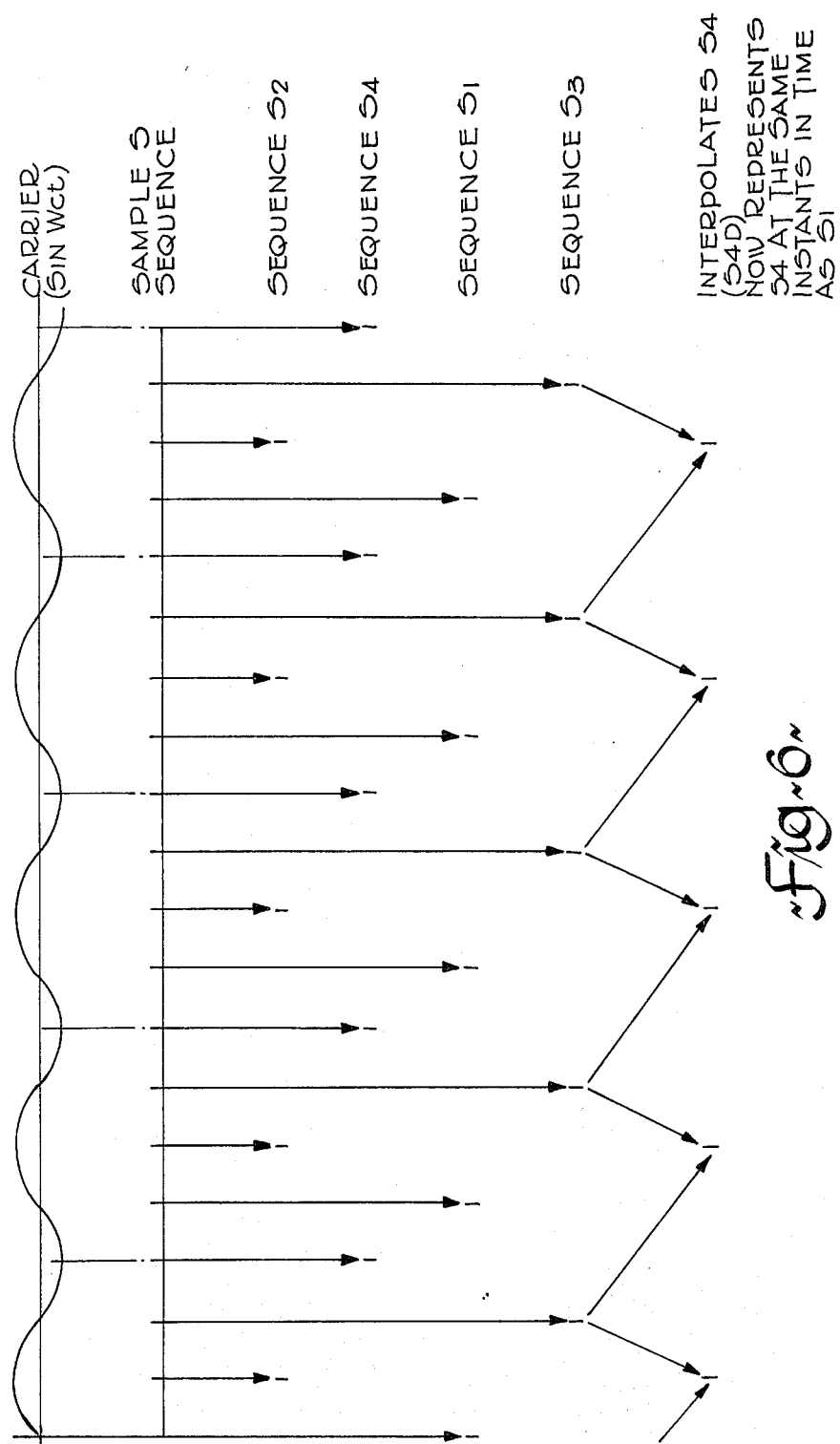
FIG. 6 is a diagram illustrating the demultiplexing technique for the signal of FIG. 5.

The thus filtered multiplexed signal is fed to analog-to-digital converter 42 which, as before, samples the signal at a sampling frequency which is four times $\omega_c$ and supplies a sequence of samples S to logic circuits 44. Logic circuits 44 rearrange the sequence S into four sequences $S_1$, $S_2$, $S_3$, and $S_4$ as illustrated in FIG. 6. The $S_1$ sequence of samples are the first samples taken within each of the periods of the reference frequency. Similarly, the $S_2$, $S_3$ and $S_4$ samples are the second, third and fourth samples taken in each period of the reference frequency. Thereafter, logic circuits 44 produce three additional sequences of samples $S_2D$, $S_3D$ and $S_4D$, each representing the values of sequences $S_2$, $S_3$ and $S_4$ at the instance of time at which the corresponding $S_1$ samples were taken. The logic circuits then rearrange the sequences thus obtained to form sequences $S_1'$, $S_2'$ and $S_3'$ in accordance with the following expressions:

$$S_1' = S_1 + S_3D \tag{5}$$

$$S_2' = S_1 - S_3D \tag{6}$$

$$S_3' = S_2D - S_4D \tag{7}$$

wherein $S_1'$ represents the original baseband $A_3(t)$, $S_2'$ represents the original in-phase modulated signal $A_2(t)$ and $S_3'$ represents the original quadrature modulated signal $A_1(t)$.

As before, there will be instances in time wherein signals $A_1(t)$ and $A_2(t)$ will not contribute anything to the multiplexed signal. In particular, when the argument of modulated signal $A_1(t)$ is 0 or 180 degrees, $A_1(t)$ will make no contribution to the amplitude of the multiplexed signal. Similarly, when the argument of multiplex signal $A_2(t)$ is 90 or 270 degrees, it will make no contribution to the amplitude of the multiplexed signal. Thus, the sequences of samples $S_1$ and $S_3$ will be comprised of contributions from modulated signal $A_2(t)$ and the baseband signal, $A_3(t)$, while samples $S_2$ and $S_4$ will be comprised of contributions from the modulated signal $A_1(t)$ and the baseband signal $A_3(t)$. The contributions may be expressed as follows:

$$S_1 = A_2 + A_3 \tag{8}$$

$$S_2 = A_1 + A_3 \tag{9}$$

$$S_3 = -A_2 + A_3 \tag{10}$$

$$S_4 = -A_1 + A_3 \tag{11}$$

By substituting equations 8, 9, 10 and 11 into expressions 5, 6 and 7, it will be seen that the original component signals of the multiplexed signal may be readily and simply determined.

Again, to ensure accuracy of the results, it is important to maintain the phase and magnitude of the sampling frequency in synchronism with the reference frequency. Accordingly, as before, the logic circuits 44 supply a signal to sample controller 46 representing the phase offset, if any. Controller 46 adjusts the phase and/or magnitude of the sampling frequency as previously explained and continues to supply signals to converter 42.

PULSE CODE MODULATION

Figure 7:
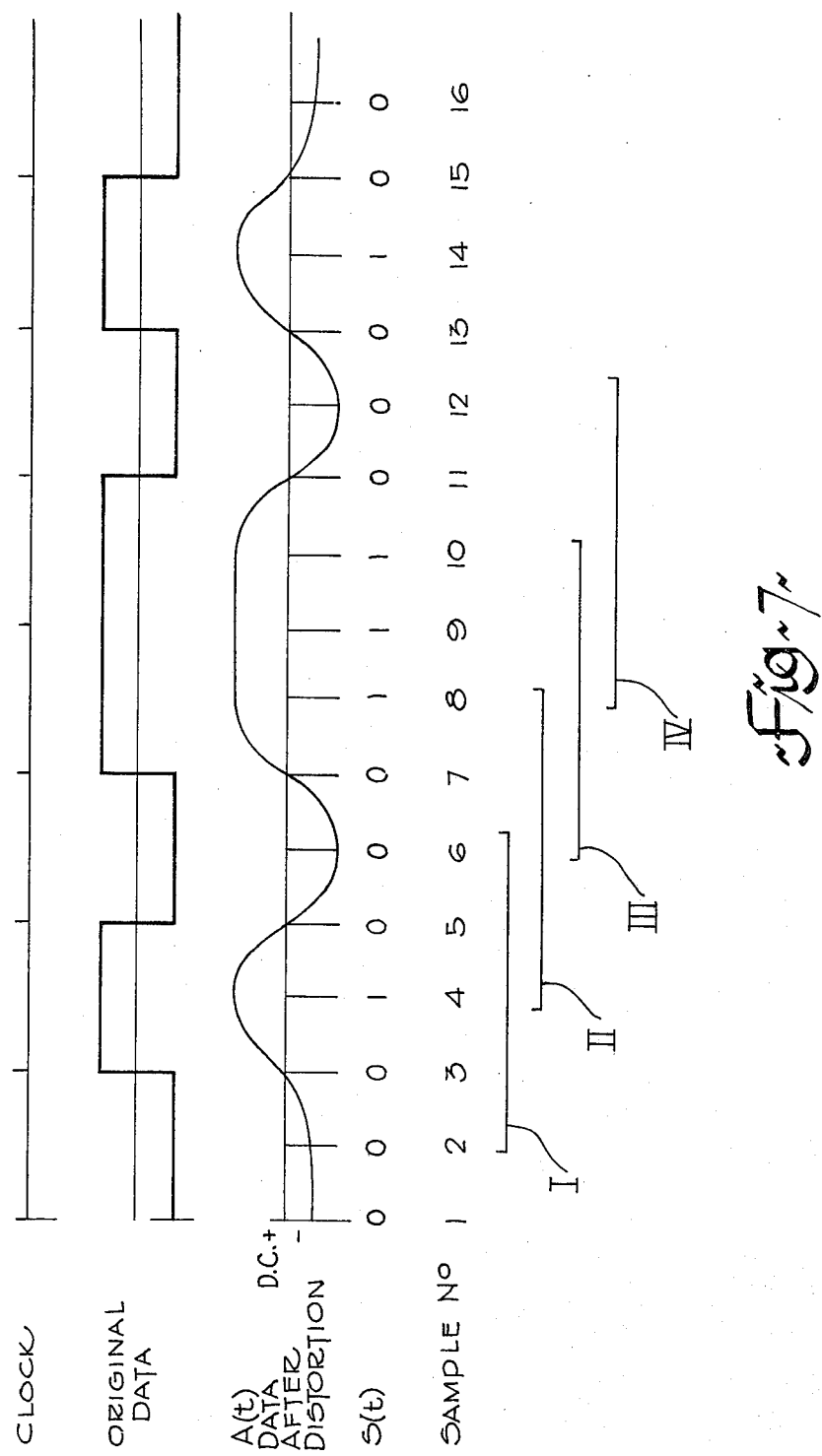
FIG. 7 is a diagram illustrating a PCM signal sampling sequence.

The present invention is also applicable in the demultiplexing of a signal consisting of a pulse code modulated sequence of data which is subject to distortion in telemetry. In this scheme, digital data of any kind can be transmitted as a sequence of 1's and 0's represented by different voltage levels such as $+V$ representing a 1 and $-V$ representing a 0. The bits are transmitted at an approximately constant rate $F_c$. The transmission process often introduces distortion into the wave form caused by low-filtering of the signal with a cut-off frequency of $0.4 F_c$ or higher, due to bandwidth limitation on the transmission link. FIG. 7 illustrates the original digital data prior to distortion in-phase with transmission rate $F_c$ and also illustrates, in-phase, the digital data A(t) after distortion.

In order to recover the original bit sequence, in accordance with the present invention, signal A(t) is passed through a low-pass filter 40 with cut-off at approximately $0.5 F_c$. This produces a filtered signal $A_F(t)$.

The thus filtered signal is supplied to analog-to-digital converter 42, used as a level detector, which samples $A_F(t)$ at a sampling frequency equal to two times $F_c$. Converter 42 then produces a series of samples S(t) where each sample is quantized to one bit, that is, to a "1" if positive and "0" if negative. FIG. 7 illustrates a sequence of samples S(t) obtained by sampling the illustrated wave form.

The series of samples S(t) are fed to logic circuits 44. In this instance, the logic circuits are not intended to recover the original component signals of the PCM signal. Current techniques for recovering the original signals can readily do so given the original bit stream. The original bit stream is readily obtained in accordance with the present invention as will be explained later. Rather, the particular purpose of the logic circuits in this instance is to generate control signals representative of phase differential between the transmission rate $F_c$ and the sampling rate and feed the signals back to the sample controller 46 in order to ensure synchronism between the sampling rate and the transmission rate. The output of the logic circuits 44 consists of a signal obtained by means of a simple test of the series of samples S(t) plus a clock.

The signal S(t) is examined in groups of five consecutive bits, at intervals of two bits, to determine the average position of transitions, a condition where successive samples change from being the same to being different. In particular, the average position of transition is determined for transitions occuring between one and four positions away from the reference sample, sample 1 of each group of five samples. Sample 1 must be a center bit sample, that is, a sample which occurs between two transition bits. Thus, with reference to FIG. 7, it will be observed that the even numbered samples are centre bit samples while the odd numbered samples are transition samples.

Figure 8:
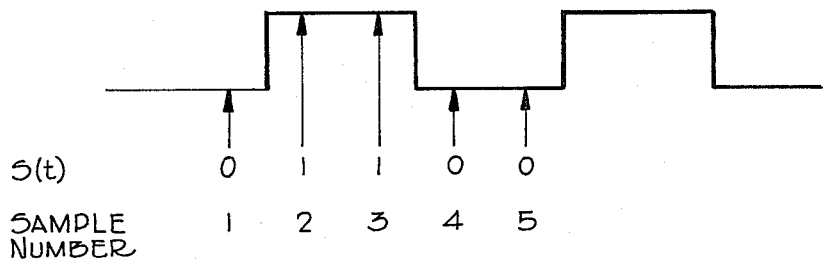
FIGS. 8 and 9 illustrate five consecutive samples to be analyzed in PCM demultiplexing.

The transition bits of each group of five consecutive bits are compared with its adjacent centre bits in order to determine the phase relationship between the sampling rate and the transmission rate. If the transition bits are like their following bits, then the sampling rate lags the transmission rate. This situation is illustrated in FIG. 8 wherein five consecutive samples are illustrated. It will be noted that transition bits, samples 2 and 4, are like their respective following center bits 3 and 5. A phase lag situation may be designated by a negative while a phase advance situation may be designated by a positive. In the situation of FIG. 8, the sampling rate lags the transmission rate and, accordingly, the control circuits 44 would signal sample controller 46 to advance the sampling rate in order to bring it into synchronism with the transmission rate.

Figure 9:
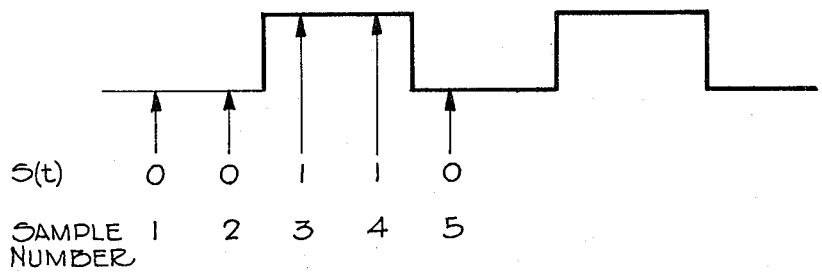

FIG. 9 illustrates the opposite situation, that is, the situation wherein the sampling rate is advanced with respect to the transmission rate. Thus, for the same samples, the pattern of bits has changed from 0 1 1 0 0 as in FIG. 8 to 0 0 1 1 0 as in FIG. 9. In FIG. 9, the transition bits 2 and 4 are like their preceding bits and, accordingly, the situation is designated by a positive. Accordingly, logic circuits 44 signal controller 46 to delay the sampling rate so as to bring the sampling rate more closely into synchronism with the transmission rate.

Table I tabulates the 32 possible bit patterns and the phase information conveyed thereby. In the column entitled "Relative Phase Information", the "plus" and "minus" signs designate the lag and advance phase relationship as between the sampling rate and transition rates. The numbers in the column indicate the number of transition bits in each sequence which convey relative phase information. For example, in pattern 4, only the first transition bit conveys phase information. That transition bit is like the preceding center bit and, therefore, the sampling rate is advanced with respect to the transmission rate. However, the second transition bit is unlike both its preceding and following centre bits and, accordingly, it is not possible to determine any phase information from this situation.

The phase information conveyed by pattern 6 is "+2". This indicates that the sampling rate is advanced with respect to the transmission rate and that both transition bits convey information.

The phase information conveyed by pattern 8 is "0". This means that both transition bits are either like or unlike their adjacent centre bits and that, accordingly, the sampling rate is in synchronism with the transmission rate. The same general situation is observed with respect to patterns 0, 2, 4, 10, 14, 17, 21, 23, 27, 29 and 31.

The objective of the control circuits, therefore, will be to signal the sample controller in such a manner that the relative phase information obtained is "0".

FIG. 7 illustrates four consecutive sequences of five bits numbered I, II, III and IV as they are examined by the control circuits. The preceding and following sequences would be examined in a similar fashion. The phase of the sampling rate is adjusted at regular intervals to ensure and maintain correct phasing with sample 1. Based upon the history of phase adjustments, the sampling rate may be adjusted in a manner similar to that described previously with respect to the in-phase and quadrature application of the invention.

It will be apparent from the foregoing that the original bit stream may be readily determined. In particular, it is comprised of every second sample of S(t). These bits may be readily separated from the transition bits and fed to other logic circuits adapted to recover the original signals in accordance with current techniques.

It will be understood that the sequence of samples S(t) may be analyzed in other numbered groups and different intervals provided that the sampling rate is appropriately altered without departing from the spirit of the present invention.

It will be seen from the foregoing description and examples that the apparatus aspect of the present invention is comprised of three major components, the analog-to-digital converter, the sample controller and the logic circuits, and that three such components are used for demultiplexing, regardless of the multiplexing technique. The converter and controller are components which will be well known to those to whom the specification is addressed. The converter is adapted to sample an incoming signal when signaled to do so by measuring the amplitude of the incoming signal, converting the measurement into an electrical signal in the form of a digital word and, then, outputting the signal. The controller controls the sampling rate and provides signals to the converter at the sampling rate. The controller is adapted to automatically modify the phase and/or magnitude of the sampling rate upon receipt of appropriate electrical signals.

The logic circuits may be an electrical or electronic circuit or a series of electrical or electronic circuits designed to carry out the functions discussed earlier. It is believed that it is within the knowledge of those to whom the specification is addressed to construct appropriate electrical or electronic circuits to carry out the aforediscussed functions on the basis of the instructions given. The logic circuits may also be in the form of appropriately programmed digital computer means which can readily deal with digital signals. Again, it is believed to be within the scope of the knowledge of those to whom the specification is addressed to provide an appropriately programmed computer means. The apparatus aspect of the present invention resides in a novel combination of the aforementioned components.

The present invention has been described with reference to three specific multiplexing techniques. However, it is to be understood that the present invention is not to be limited to such techniques but, rather, that it may be applied to other well known multiplexing tech-

TABLE I
PHASE CORRECTION DATA

| Pattern # | Binary Sequence | Relative Phase Information |
|---|---|---|
| 0 | 0 0 0 0 0 | 0 |
| 1 | 0 0 0 0 1 | +1 |
| 2 | 0 0 0 1 0 | 0 |
| 3 | 0 0 0 1 1 | −1 |
| 4 | 0 0 1 0 0 | 0 |
| 5 | 0 0 1 0 1 | +1 |
| 6 | 0 0 1 1 0 | +2 |
| 7 | 0 0 1 1 1 | +1 |
| 8 | 0 1 0 0 0 | 0 |
| 9 | 0 1 0 0 1 | +1 |
| 10 | 0 1 0 1 0 | 0 |
| 11 | 0 1 0 1 1 | −1 |
| 12 | 0 1 1 0 0 | −2 |
| 13 | 0 1 1 0 1 | −1 |
| 14 | 0 1 1 1 0 | 0 |
| 15 | 0 1 1 1 1 | −1 |
| 16 | 1 0 0 0 0 | −1 |
| 17 | 1 0 0 0 1 | 0 |
| 18 | 1 0 0 1 0 | −1 |
| 19 | 1 0 0 1 1 | −2 |
| 20 | 1 0 1 0 0 | −1 |
| 21 | 1 0 1 0 1 | 0 |
| 22 | 1 0 1 1 0 | +1 |
| 23 | 1 0 1 1 1 | 0 |
| 24 | 1 1 0 0 0 | +1 |
| 25 | 1 1 0 0 1 | +2 |
| 26 | 1 1 0 1 0 | +1 |
| 27 | 1 1 0 1 1 | 0 |
| 28 | 1 1 1 0 0 | −1 |
| 29 | 1 1 1 0 1 | 0 |
| 30 | 1 1 1 1 0 | +1 |
| 31 | 1 1 1 1 1 | 0 |

The embodiments of the invention in which an exclusive property or privilege is claimed are defined as follows:

1. A method of demultiplexing a multiplexed signal comprising components representing the result of multiplexing at least one original signal and a reference frequency having in phase and quadrature components, said method comprising the steps of:
   (a) sampling said multiplexed signal at a controllable frequency which is a multiple of said reference frequency to provide a series of samples;
   (b) rearranging the samples of said series into different series representative of said at least one original signal and the in phase and quadrature components of said frequency;
   (c) determining the phase differential between said reference and controllable frequencies by determining the d.c. content of the series which represent the in phase and quadrature components of the reference frequency; and
   (d) adjusting said controllable frequency toward synchronism with said reference frequency by an amount which is a function of the phase differential determined in step (c).

2. A method as defined in claim 1, said controllable frequency being substantially equal to four times said reference frequency.

3. A method as defined in claim 1, said controllable frequency being substantially equal to two times said reference frequency.

4. A method as defined in any one of claims 1, 2 or 3, comprising, prior to step (a), the step of removing unwanted frequencies from said multiplexed signal to provide a filtered multiplexed signal.

5. A method as defined in claim 1, wherein said sampling step includes the steps of:
   (a) measuring the amplitude of said multiplexed signal at instants of time defined by said controllable frequency to provide a series of measurements; and
   (ii) converting the measurements of said series of measurements into digital numbers.

6. A method as defined in claim 1, wherein said phase differential is determined by taking the ARCTAN of the quotient obtained by dividing the d.c. content of the quadrature component of the reference frequency by the d.c. content of the in phase component of the reference frequency.

7. A method as defined in claim 1, wherein the phase parameter of said controllable frequency is adjusted so as to move said controllable frequency toward synchronism with said reference frequency.

8. A method as defined in claim 1, wherein the magnitude of said controllable frequency is adjusted so as to move said controllable frequency toward synchronism with said reference frequency.

9. A method of demultiplexing a multiplexed signal comprising components representing the result of multiplexing at least two original signals and a reference frequency, said method comprising the steps of:
   (a) removing unwanted frequencies from said multiplexed signal to produce a filtered multiplexed signal;
   (b) measuring the amplitude of said filtered multiplexed signal at predetermined instants of time defined by a controllable frequency substantially equal to four times said reference frequency to produce a series of measurements;
   (c) converting each measurement of said series to a digital number to produce a series of samples of said filtered multiplexed signal;
   (d) rearranging said series of samples into different series of samples which are representative of said at least two original signals;
   (e) measuring the d.c. content $D_1$ and $D_2$ of two of said different series of samples;
   (f) obtaining the phase differential, $\phi rel$, between said reference frequency and said controllable frequency in accordance with the following expression:

$$\phi rel = ARCTAN\ D_2/D_1 \qquad (1);$$

(g) adjusting the phase parameter of said controllable frequency toward said reference frequency by an amount proportional to $\phi rel$ so as to bring said controllable frequency into synchronism with said reference frequency; and
   (h) periodically adjusting the magnitude parameter of said controllable frequency toward said reference frequency in accordance with the following expression:

$$a = \pm c/t\ [Ht]H_2,$$

wherein
   c = total rotation of phase
   t = time in which rotation took place.

10. An apparatus for demultiplexing a multiplexed signal comprising components representing the result of multiplexing at least two original signals and a reference frequency, said apparatus comprising:
   means for sampling said multiplexed signal at a controllable frequency which is a multiple of said reference frequency and providing a series of signals representative of samples taken;

means for rearranging said series of signals into different series of signals representative of said original signals;

means responsive to said different series of signals for determining the phase differential between said reference frequency and said controllable frequency and producing a signal representative of the determined phase differential, said means responsive to said different series of signals including means for measuring the d.c. content of two of said different series of signals; and means for generating said controllable frequency and providing sampling signals to said sampling means, said generating means being adapted to adjust at least one of the phase and magnitude of said controllable frequency in response to said signal representative of the determined phase differential for moving said controllable frequency toward synchronism with said reference frequency.

11. An apparatus as defined in claim 10, wherein said generating means generates a controllable frequency which is four times said reference frequency.

12. An apparatus as defined in claim 10, wherein said generating means generates a controllable frequency which is two times said reference frequency.

13. An apparatus as defined in claim 10, further including means for removing unwanted frequencies and signals from said multiplexed signal.

14. An apparatus as defined in claim 10, wherein said sampling means includes:
means for measuring the amplitude of said multiplexed signal at instants of time determined by said generating means;
and
means for converting measurements of the amplitude into a series of signals representing digital numbers.

15. An apparatus as defined in claim 10, wherein said determining means determines the phase differential by determining the arctan of the quotient obtained by dividing the d.c. content of one of said different series of signals by the d.c. content of another of said different series of signals.

16. An apparatus as defined in claim 10, said sampling means comprising an analog-to-digital converter.

17. An apparatus as defined in claim 10, said rearranging and determining means comprising electrical circuits.

18. An apparatus as defined in claim 10, said rearranging and determining means comprising electronic circuits.

19. An apparatus as defined in claim 10, said rearranging and determing means comprising a computer.

20. An apparatus for demultiplexing a multiplexed signal comprising components representing the results of multiplexing at least two original signals and a reference frequency, said apparatus comprising:

a filter for removing unwanted frequencies and signals from said multiplexed signal and providing a filtered multiplexed signal;

an analog-to-digital converter for measuring the amplitude of said filtered multiplexed signal at predetermined instants of time to obtain corresponding measurements, converting said corresponding measurements into electrical signals, representing the corresponding measurements as digital words, and outputting said corresponding measurements as said digital words;

a controller for generating and providing sampling signals to said converter, said controller generating said signals at a controllable frequency which is substantially four times said reference frequency, and having a phase control for selectively advancing or delaying said controllable frequency, and a magnitude control for selectively increasing or reducing the magnitude of said controllable frequency;

first electrical circuit means for rearranging said series of electrical signals into different series of electrical signals which are representative of said at least two original signals and said reference frequency, and outputting said different series of electrical signals; and second electrical circuit means responsive to two of said different series of electrical signals for determining the phase differential between said controllable and said reference frequencies from the d.c. content of said two of said different series, and providing an electrical signal representative of the phase differential to said controller;

said controller being adapted to adjust at least one of said phase and magnitude controls so as to bring said controllable frequency toward synchronism with said reference frequency.

21. An apparatus for demultiplexing a multiplexed signal comprising components representing the result of multiplexing at least two original signals and a reference frequency, said apparatus comprising:

a filter for removing unwanted frequencies and signals from said multiplexed signal and providing a filtered multiplexed signal;

an analog-to-digital converter for measuring the amplitude of said filtered multiplexed signal at predetermined instants of time to obtain corresponding measurements, converting said corresponding measurements into electrical signals, representing the corresponding measurements as digital words, and outputting said corresponding measurements as said digital words;

a controller for generating and providing sampling signals to said converter, said controller generating said signals at a controllable frequency which is substantially four times said reference frequency, and having a phase control for selectively advancing or delaying said controllable frequency, and a magnitude control for selectively increasing or reducing the magnitude of said controllable frequency;

first computer means for rearranging said series of electrical signals into different series of electrical signals which are representative of said at least two original signals and outputting said different series of electrical signals; and second computer means responsive to two of said different series of electrical signals for determining the phase differential between said controllable and said reference frequencies from the d.c. content of said two of said different series, and providing an electrical signal representative of the phase differential to said controller;

said controller being adapted to adjust at least one of said phase and magnitude controls so as to bring said controllable frequency toward synchronism with said reference frequency.

22. A method of demultiplexing a signal M(t), having a reference frequency $\omega_c$, multiplexed by in-phase and in-quadrature sinusoids from two, independent signals $A_1(t)$ and $A_2(t)$, comprising the steps of:
(a) sampling said multiplexed signal M(t) at a controllable frequency $\omega_f$ which is four times said reference frequency to produce a series of samples S(t), each sample being a measurement of the amplitude of said multiplexed signal;
(b) converting each sample to a digital number;
(c) rearranging said series of samples into two new series of samples I(t) and Q(t) representative of the two independent signals $A_1(t)$ and $A_2(t)$ in accordance with the following expressions:

$$I_{(r)} = S_{(2r-1)} \times (-1)^r \quad (1)$$

$$Q_{(r)} = S_{(2r)} \times (-1)^r \quad (2)$$

(d) determining the d.c. content, $D_1$ and $D_2$, of said new series of samples I(t) and Q(t);
(e) determining the phase differential $\phi$rel between said reference frequency and said controllable frequency as follows:
;ti $\phi$rel = ARCTAN $D_2/D_1$ (3);
and
(f) adjusting said controllable frequency by an amount proportional to $\phi$rel toward synchronism with said reference frequency.

23. A method as defined in claim 3, wherein the magnitude of said controllable frequency is adjusted at predetermined intervals by an amount a, wherein:
$a = \pm c/t$ Hz
wherein
c = total rotation of phase
t = time in which rotation took place.

24. A method as defined in any one of claims 22 or 23, wherein, prior to step (a), including the step of removing unwanted frequencies above a predetermined frequency from said multiplexed signal.

25. A method of demultiplexing a signal M(t) having a reference frequency $\omega_c$ multiplexed by in-phase and quadrature sinusoids from two original, independent signals $A_1(t)$ and $A_2(t)$ to which a baseband signal $A_3(t)$ has been added, said method comprising the steps of:
(a) sampling said multiplexed signal at a controllable frequency $\omega_f$ which is four times said reference frequency and providing a series of samples S(t), each sample being a measurement of the amplitude of said multiplexed signal;
(b) converting each sample to a digital number;
(c) rearranging said series of samples S(t) into four series of samples $S_1(t)$, $S_2(t)$, $S_3(t)$ and $S_4(t)$, wherein series $S_1(t)$, $S_2(t)$ and $S_4(t)$ respectively correspond to the first, second, third and fourth samples taken within a plurality of periods of said reference frequency;
(d) providing new series of samples $S_2D$, $S_3D$ and $S_4D$, wherein each sample therein is the value of the corresponding samples in $S_2(t)$, $S_3(t)$ and $S_4(t)$, respectively, at the instants in time that the corresponding $S_1(t)$ samples were taken;
(e) forming three other new series of samples $S_1(t)^1$, $S_2(t)^1$ and $S_3(t)^1$ in accordance with the following expressions:

$$S_1(t)^1 = S_1(t) + S_3D \quad (1)$$

$$S_2(t)^1 = S_1(t) - S_3D \quad (2)$$

$$S_3(t)^1 = S_2D - S_4D \quad (3)$$

wherein
$S_1(t)^1$ represents the original baseband signal $A_3(t)$
$S_2(t)^1$ represents the original in phase signal $A_1(t)$
$S_3(t)^1$ represents the original quadrature signal $A_2(t)$;
(f) determining the d.c. content, $D_1$ and $D_2$, of $S_2(t)^1$ and $S_3(t)^1$;
(g) determining the phase differential $\phi$rel between said reference frequency and said controllable frequency, in accordance with the following expression:

$$\phi\text{rel} = \text{ARCTAN } D_2/D_1 \quad (4);$$

and
(h) adjusting said controllable frequency toward said reference frequency by an amount proportional to $\phi$rel.

26. A method as defined in claim 25, wherein the phase of said controllable frequency is adjusted in said adjusting step (h).

27. A method as defined in claim 25, wherein the magnitude of said controllable frequency is adjusted in said adjusting step (h).

28. A method as defined in claim 25, wherein both the phase and magnitude of said controllable frequency are adjusted in said adjusting step (h).

29. A method as defined in claim 25, wherein, prior to step (a), unwanted frequencies above a predetermined frequency are removed from said multiplexed signal.

30. A method of bit detection of a signal comprising a pulse code modulated sequence of data transmitted at a transmission rate Fc, said method comprising the steps of:
(a) sampling said signal at a controllable sampling rate F equal to twice said transmission rate Fc to produce a series of samples S(t);
(b) quantizing each positive sample of said series to a "one" and each negative sample to a "zero";
(c) analyzing said series of samples in groups of five consecutive samples, at intervals of two samples, with the first sample in each group representing original data, by comparing the second and fourth samples of each group with their adjacent samples;
(d) advancing said sampling rate by a predetermined amount if at least one of said second of fourth samples is like its following sample;
(e) delaying said sampling rate by a predetermined amount if at least one of said second and fourth samples is like its preceding sample; and
(f) maintaining said sampling rate if said second and fourth samples are both unlike their respective adjacent samples.

31. A bit detector for detecting and identifying the bit stream of a signal comprising a pulse code modulated sequence of data transmitted at a transmission rate Fc, said detector comprising:
an analog-to-digital converter for detecting the voltage level of said signal at predetermined instants of time, converting the detected voltage levels into a series of electrical signals representing binary numbers "1" or "0" wherein a "1" represents a positive voltage level and a "0" represents a negative voltage level, and outputting said series of electrical signals;
a controller for generating and providing detecting signals to said converter, said controller being adapted to generate said detecting signals at a controllable rate which is substantially equal to two times said transmission rate and having a phase control for selectively advancing or delaying said controllable rate and a magnitude control for selectively increasing or reducing the magnitude of said controllable rate; and electrical circuit means for analyzing said series of electrical signals in groups of five signals at intervals of two signals, with the first signal in each group representing original data, by comparing the second and fourth signals with their adjacent signals, and providing a control signal to said controller;

said controller being responsive to said control signal for adjusting at least one of said phase and magnitude controls.

32. A bit detector for detecting and identifying the bit stream of a signal comprising a pulse code modulated sequence of data transmitted at a transmission rate Fc, said detector comprising:

an analog-to-digital converter for detecting the voltage level of said signal at predetermined instants of time, converting the detected voltage levels into a series of electrical signals representing binary numbers "1" or "0" wherein a "1" represents a positive voltage level and a "0" represents a negative voltage level, and outputting said series of electrical signals;

a controller for generating and providing detecting signals to said converter, said controller being adapted to generate said detecting signals at a controllable rate which is substantially equal to two times said transmission rate, and having a phase control for selectively advancing or delaying said controllable rate and a magnitude control for selectively increasing or reducing the magnitude of said controllable rate; and electrical circuit means for analyzing said series of electrical signals by comparison of every other signal of said series of signals with its adjacent signals, and providing a control signal to said controller;

said controller being responsive to said control signal for adjusting at least one of said phase and magnitude controls.

* * * * *